(12) United States Patent
Nakada et al.

(10) Patent No.: US 8,469,564 B2
(45) Date of Patent: Jun. 25, 2013

(54) VEHICULAR LAMP

(75) Inventors: Asami Nakada, Shizuoka (JP); Kazunori Natsume, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 409 days.

(21) Appl. No.: 12/951,764

(22) Filed: Nov. 22, 2010

(65) Prior Publication Data
US 2011/0128750 A1 Jun. 2, 2011

(30) Foreign Application Priority Data

Nov. 27, 2009 (JP) ................. 2009-269910

(51) Int. Cl.
*F21V 7/00* (2006.01)
*F21V 8/00* (2006.01)

(52) U.S. Cl.
USPC .......................................... 362/518; 362/511

(58) Field of Classification Search
USPC .......................................... 362/511, 517, 518
See application file for complete search history.

(56) References Cited

U.S. PATENT DOCUMENTS

| 6,641,290 B2 * | 11/2003 | Ishiharada ............... 362/511 |
| 2006/0104076 A1 | 5/2006 | Erber |
| 2008/0013333 A1 | 1/2008 | Koizumi et al. |

FOREIGN PATENT DOCUMENTS

| DE | 10317062 A1 | 10/2004 |
| DE | 10359182 A1 | 7/2005 |
| DE | 102008016764 A1 | 10/2009 |
| JP | 2008-010227 A | 1/2008 |
| WO | WO 2004/042271 A2 | 5/2004 |

OTHER PUBLICATIONS

English abstract of JP2008010227 published on Jan. 17, 2008, espacenet database, 1 page.
Extended European Search Report for Application No. 10192701.0, mailed on Apr. 12, 2011 (7 pages).
esp@cenet Patent Abstract for German Publication No. 102008016764, publication date Oct. 8, 2009. (1 page).
esp@cenet Patent Abstract for German Publication No. 10359182, publication date Jul. 21, 2005. (1 page).
esp@cenet Patent Abstract for German Publication No. 10317062, publication date Oct. 28, 2004. (1 page).

* cited by examiner

*Primary Examiner* — David V Bruce
(74) *Attorney, Agent, or Firm* — Osha Liang LLP

(57) ABSTRACT

A vehicular lamp includes a light source; a light guide that guides the light from the light source; and a reflector. The light guide includes an incident portion to which light from the light source is incident, wherein light entering from the incident portion is guided through the light guide; and a plurality of reflection portions that internally reflect a portion of the guided light toward the reflector. The reflector reflects, in a lamp illumination direction, reflection light that is emitted from the light guide following internal reflection by the plurality of reflection portions.

15 Claims, 8 Drawing Sheets

VEHICULAR LAMP

BACKGROUND OF INVENTION

1. Field of the Invention

The present invention relates to a vehicular lamp that is applied to a marker lamp of a vehicle such as an automobile, and in particular, relates to a vehicular lamp having an LED (light emitting diode) as a light source.

2. Related Art

As an example of conventional vehicular lamps, there is a vehicular lamp that includes an LED; a reflector that reflects light from the LED to the front of the lamp; and a light guide in which light from the LED is incident from one side and emitted from another side (refer to Patent Document 1, for example).

In the vehicular lamp disclosed in Patent Document 1, among light from the LED, light in the vicinity of an optical axis is incident to the light guide, and other light is reflected by a reflection surface of the reflector. Thus, a portion of light from the LED is used to illuminate the light guide, and other light is reflected by the reflector so as to be radiated in the lamp illumination direction.

[Patent Document 1] Japanese Patent Application Laid-Open (Kokai) No. 2008-10227

SUMMARY OF INVENTION

However, in the above vehicular lamps, the LED is disposed in front of or on the side of the reflector. Therefore, when viewing the lamp from the front, the LED or a substrate for the LED is visible in front of or on the side of the reflector, making a component for hiding the LED necessary.

Moreover, to make the above vehicular lamp appear to be of multi-lamp type, a number of LEDs corresponding to the number of lamps is required. This increases assembly man-hours, and a plurality of substrates is required. For these reasons, achieving a reduction in costs has been difficult.

One or more embodiments of the present invention provide a vehicular lamp that can realize a multi-lamp type with a good appearance, reduce the number of light sources and substrates, and achieve a reduction in assembly man-hours and costs.

A vehicular lamp in accordance with one or more embodiments of the present invention includes: a light source; a light guide that guides light from the light source; and a reflector, wherein the light guide includes an incident portion to which light from the light source is incident, wherein light entering from the incident portion is guided through the light guide; and a plurality of reflection portions that internally reflect a portion of the guided light toward a reflector; and wherein the reflector that reflects, in a lamp illumination direction, reflection light that is emitted from the light guide following internal reflection by the plurality of reflection portions.

According to the vehicular lamp with the above configuration, the light from the light source is internally reflected by the plurality of reflection portions of the light guide toward the reflector, so that a plurality of pseudo light-emitting portions can be formed on the light guide. Thus, the light source and a substrate are not seen around the reflector, and a multi-lamp type with a good appearance can be achieved. Further, the number of light sources and substrates can be reduced, which enables a reduction in assembly man-hours and costs.

Also, in the vehicular lamp with the above configuration, it is preferable that the light guide have the reflection portions arranged in a stepped configuration on one surface, and a diffusion step on another surface opposite the reflection portions.

According to the vehicular lamp with this configuration, the light from the light source is incident from both side ends of the light guide, and entirely reflected by the plurality of reflection portions corresponding to the reflector. The light is then diffused from the diffusion step corresponding to the reflection portion toward the reflector, and radiated from the reflector in the light illumination direction. Therefore, it is possible to enhance the light distribution performance of the light guide.

Also, in the vehicular lamp with the above configuration, the reflector is preferably disposed behind the light guide, and the light from the light source in preferably internally reflected by the reflection portion toward the back surface side of the light guide.

According to the vehicular lamp with this configuration, by disposing the reflector behind the light guide, it is possible to provide the light guide with a good three-dimensional appearance when the lamp is lit, due to the reflection light from the reflector and light leaking from the light guide.

Also, in the vehicular lamp with the above configuration, the reflector is preferably disposed above the light guide, and the light from the light source is preferably internally reflected by the reflection portions toward above the light guide.

According to the vehicular lamp with this configuration, the reflector is disposed above the light guide, and thus, the light guide is not positioned in front of the reflector. Therefore, the reflection direction of reflection light from the reflector is not limited. Further, it is possible to make the lamp more compact in the depth direction.

With the vehicular lamp according to one or more embodiments of the present invention, it is possible to form a plurality of pseudo light-emitting portions using the reflection portions of the light guide. This achieves a multi-lamp type with a good appearance. In addition, the number of light sources and substrates can be reduced, which enables a reduction in assembly man-hours and costs.

Other aspects and advantages of the invention will be apparent from the following description, the drawings and the claims.

DETAILED DESCRIPTION

Hereinafter, embodiments of a vehicular lamp according to one or more embodiments of the present invention will be described, based on FIGS. 1 to 8. Note that the vehicular lamp is accommodated in a lamp housing, and mounted to a vehicle as a clearance lamp, for example.

First Embodiment

Figure 1:
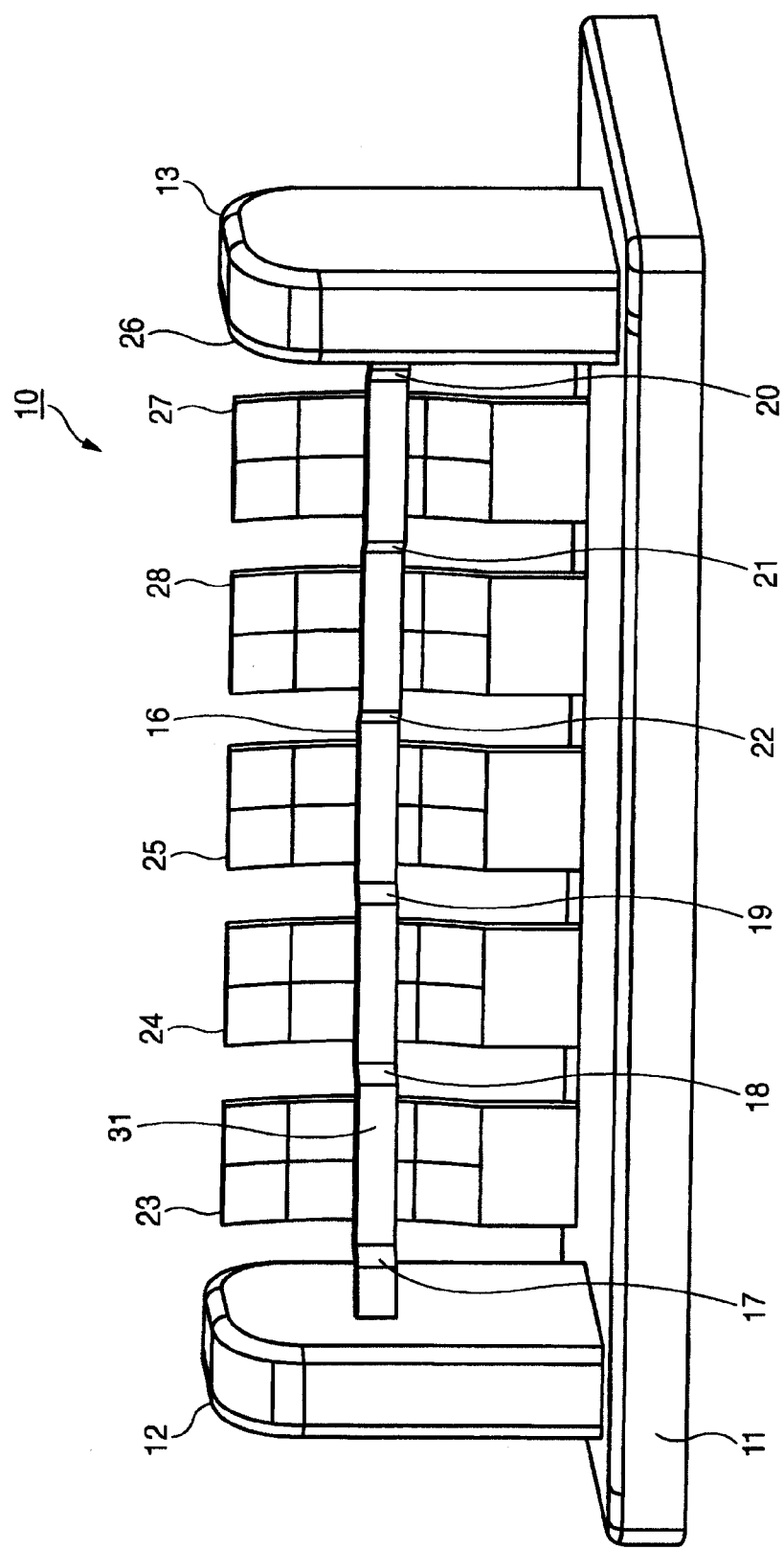
FIG. 1 is an outer perspective view of a vehicular lamp 10 according to a first embodiment of the present invention.
Figure 2:
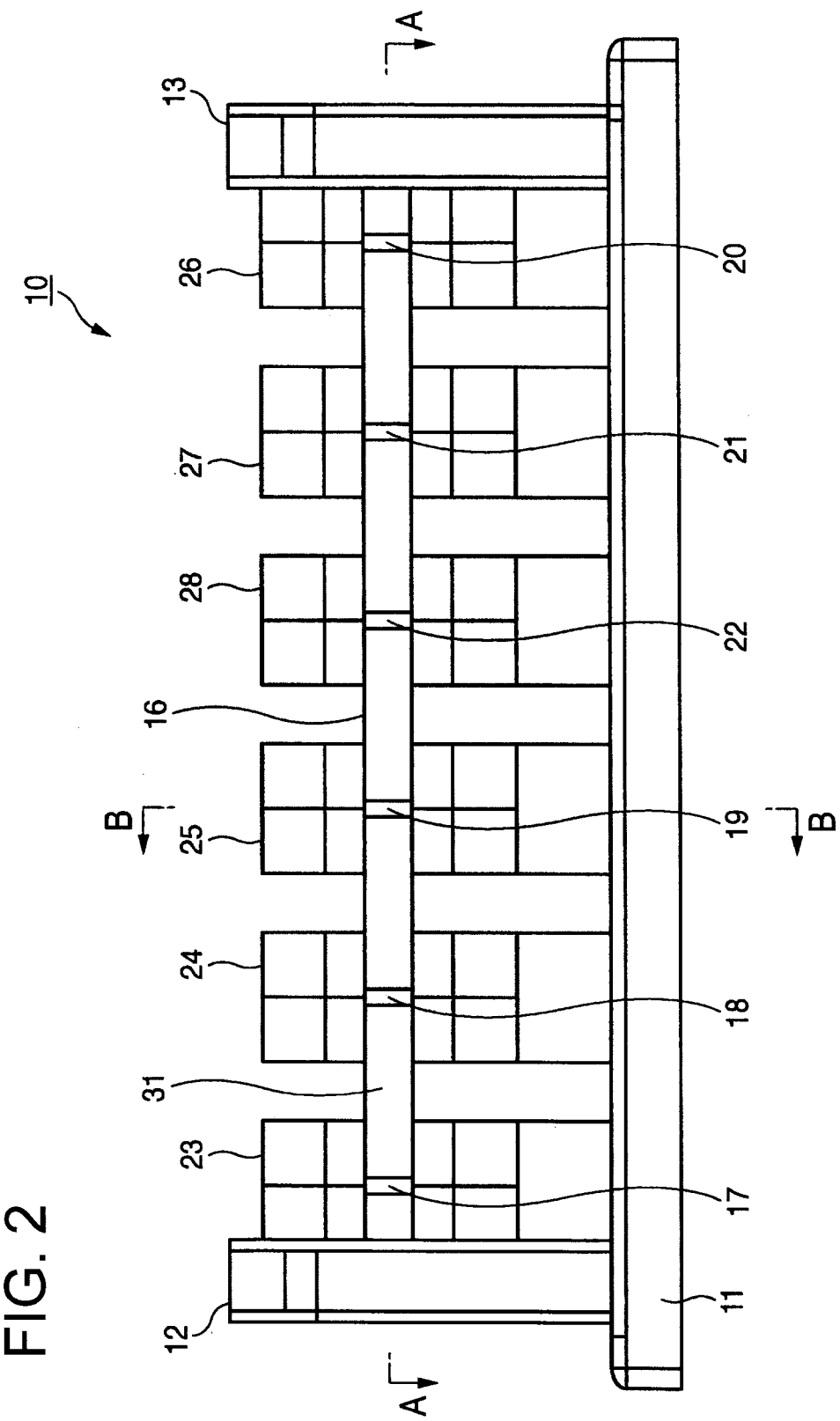
FIG. 2 is a frontal view of the vehicular lamp 10 shown in FIG. 1.
Figure 3:
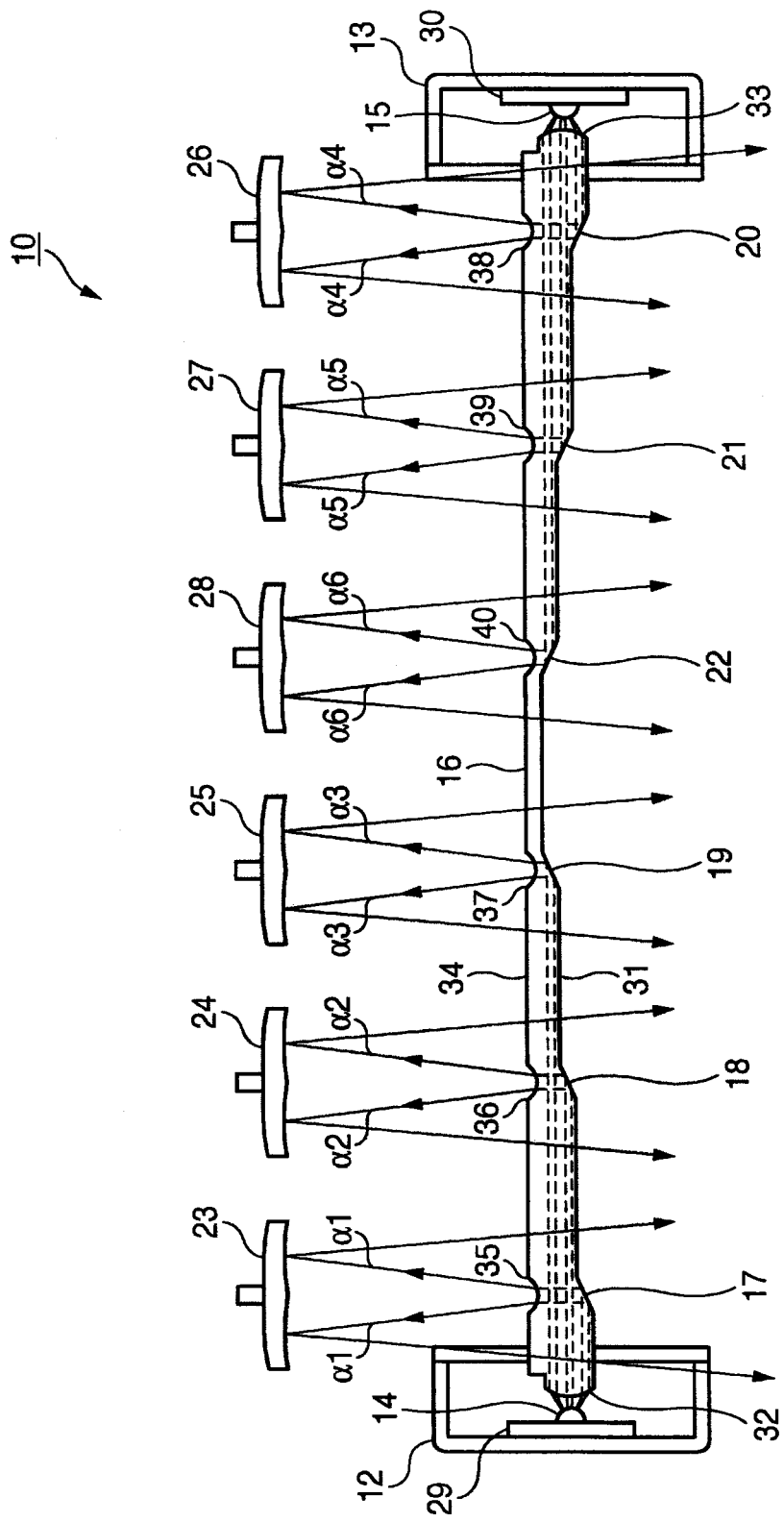
FIG. 3 is a cross-sectional view taken along a line A-A in FIG. 2.

As shown in FIGS. 1 to 3, a vehicular lamp 10 according to a first embodiment of the present invention includes a base 11, a pair of first and second LED cases 12 and 13, and a first LED 14 and a second LED 15 serving as light sources.

The vehicular lamp 10 also includes a single light guide 16 having, on a front surface 31 thereof, six reflection portions, which are disposed along respective optical axes of the LEDs 14, 15. The six reflection portions are greater in quantity than the LEDs 14, 15 and comprise a first reflection portion 17, a second reflection portion 18, a third reflection portion 19, a fourth reflection portion 20, a fifth reflection portion 21, and a sixth reflection portion 22. The light guide 16 is formed in a bar shape and disposed between the first and second LED cases 12, 13.

The vehicular lamp 10 also includes, behind the light guide 16, six reflectors, which are disposed at positions corresponding to the reflection portions 17, 18, 19, 20, 21, 22, and reflect reflection light emitted from the light guide 16 in the lamp illumination direction. The six reflectors comprise a first reflector 23, a second reflector 24, a third reflector 25, a fourth reflector 26, a fifth reflector 27, and a sixth reflector 28. The first to sixth reflectors 23 to 28 are mounted on the base 11 at a general angle of 90 degrees.

The first LED case 12 and the second LED case 13 are provided extending upward at both end portions of the base 11. The first LED 14 is mounted on a substrate 29 in the first LED case 12. The second LED 15 is mounted on a substrate 30 in the second LED case 13.

The first to sixth reflection portions 17 to 22 are formed in a stepped configuration in the lengthwise direction of the front surface 31 of the light guide 16. The first to sixth reflectors 23 to 28 are disposed corresponding to the first to sixth reflection portions 17 to 22.

The light guide 16 has incident portions 32, 33 on an end portion of the first LED 14 side and an end portion of the second LED 15 side, respectively. In the light guide 16, the first reflection portion 17, the second reflection portion 18, and the third reflection portion 19 are disposed symmetrical to the fourth reflection portion 20, the fifth reflection portion 21, and the sixth reflection portion 22.

On the back surface 34 of the light guide 16, a first diffusion step 35, a second diffusion step 36, a third diffusion step 37, a fourth diffusion step 38, a fifth diffusion step 39, and a sixth diffusion step 40 are formed. The first to sixth diffusion steps 35 to 40 are disposed opposite the first to sixth reflectors 23 to 28, respectively.

Next, optical characteristics of the vehicular lamp 10 with the above configuration will be described.

Figure 4:
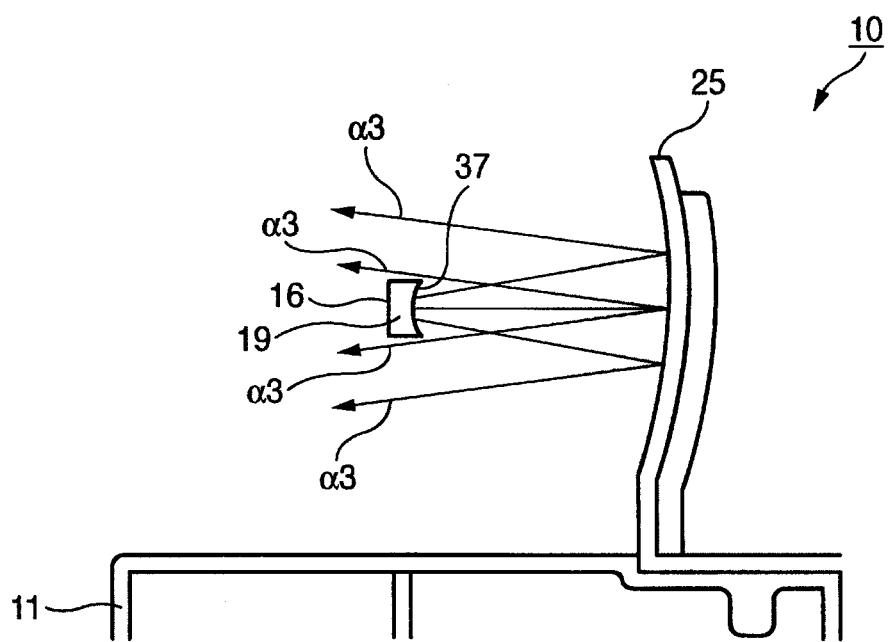
FIG. 4 is a cross-sectional view taken along a line B-B in FIG. 2.

As shown in FIGS. 3 and 4, when the first LED 14 and the second LED 15 emit light, light from the first LED 14 enters from the incident portion 32 into the light guide 16 and light from the second LED 15 enters from the incident portion 33 into the light guide 16.

Among the light from first LED 14 entering from the incident portion 32, light $\alpha 1$ directed to the first reflection portion 17 is internally reflected by the first reflection portion 17 toward the first diffusion step 35. Then, the light $\alpha 1$ is emitted as diffused light by the first diffusion step 35 toward the first reflector 23. Similarly, light $\alpha 2$ directed to the second reflection portion 18 and light $\alpha 3$ directed to the third reflection portion 19 are internally reflected by the second reflection portion 18 and the third reflection portion 19 toward the second diffusion step 36 and the third diffusion step 37. Then, the light $\alpha 2$ and $\alpha 3$ are emitted as diffused light by the second diffusion step 36 and the third diffusion step 37 toward the second reflector 24 and the third reflector 25.

Meanwhile, among the light from the second LED 15 entering from the incident portion 33, light $\alpha 4$ directed to the fourth reflection portion 20 is internally reflected by the fourth reflection portion 20 toward the fourth diffusion step 38. Then, the light $\alpha 4$ is emitted as diffused light by the fourth diffusion step 38 toward the fourth reflector 26. Similarly, light $\alpha 5$ directed to the fifth reflection portion 21 and light $\alpha 6$ directed to the sixth reflection portion 22 are internally reflected by the fifth reflection portion 21 and the sixth reflection portion 22 toward the fifth diffusion step 39 and the sixth diffusion step 40. Then, the light $\alpha 5$ and $\alpha 6$ are emitted as diffused light by the fifth diffusion step 39 and the sixth diffusion step 40 toward the fifth reflector 27 and the sixth reflector 28.

Thus, the light $\alpha 1$ to $\alpha 6$ from the two LEDs 14, 15 is reflected by the reflectors 23 to 28 in the lamp illumination direction. At this time, the light $\alpha 1$ to $\alpha 6$ are formed into six pseudo light-emitting portions due to the six reflection portions 17 to 22 of the light guide 16.

The vehicular lamp 10 according to the first embodiment described above includes: the light guide 16 that has the incident portions 32, 33 to which light from the LEDs 14, 15 is incident, guides the light from the LEDs 14, 15, and internally reflects a portion of the guided light toward the reflectors 23 to 28 using the six reflection portions 17 to 22; and the six reflectors 23 to 28 for reflecting, in the lamp illumination direction, the reflection light $\alpha 1$ to $\alpha 6$ that are internally reflected by the reflection portions 17 to 22 and subsequently emitted from the light guide 16.

Thus, the light respectively from the LEDs 14, 15 is internally reflected by the reflection portions 17 to 22 of the light guide 16 toward the corresponding reflectors 23 to 28, so that six pseudo light-emitting portions can be formed on the light guide 16. Therefore, the LEDs 14, 15 and the substrates 29, 30 are not seen around the reflectors 23 to 28, and a multi-lamp type of lamp with a good appearance can be achieved. Further, the number of LEDs and substrates can be reduced, which enables a reduction in assembly man-hours and costs.

The light guide 16 has the reflection portions 17 to 22 in a stepped configuration on the front surface 31, and has the diffusion steps 35 to 40 on the back surface 34 that is opposite the reflection portions 17 to 22.

Thus, the light respectively from the LEDs 14, 15 enters from the incident portions 32, 33 on both side ends of the light guide 16, and is entirely reflected by the reflection portions 17 to 22 corresponding to the reflectors 23 to 28. The light is then diffused from the diffusion steps 35 to 40 corresponding to the reflection portions 17 to 22 toward the reflectors 23 to 28. The reflection light $\alpha 1$ to $\alpha 6$ emitted from the light guide 16 to the back surface 34 side are reflected by the reflectors 23 to 28 and radiated in the lamp illumination direction. Therefore, it is possible to enhance the light distribution performance of the light guide 16.

In addition, the reflectors 23 to 28 are disposed behind the light guide 16. The light respectively from the LEDs 14, 15 is internally reflected by the reflection portions 17 to 22 toward the back surface 34 side of the light guide 16.

Thus, by disposing the reflectors 23 to 28 behind the light guide 16, it is possible to provide the light guide 16 with a good three-dimensional appearance such that the light guide 16 appears to be suspended in the air when the lamp is lit, due to the reflection light α1 to α6 from the reflectors 23 to 28 and light leaking from the light guide 16.

Second Embodiment

A vehicular lamp according to a second embodiment of the present invention will be described. Note that, in the second embodiment below, like reference symbols are used for structural elements similar to those of the first embodiment described above, and the descriptions of such elements are omitted.

Figure 5:
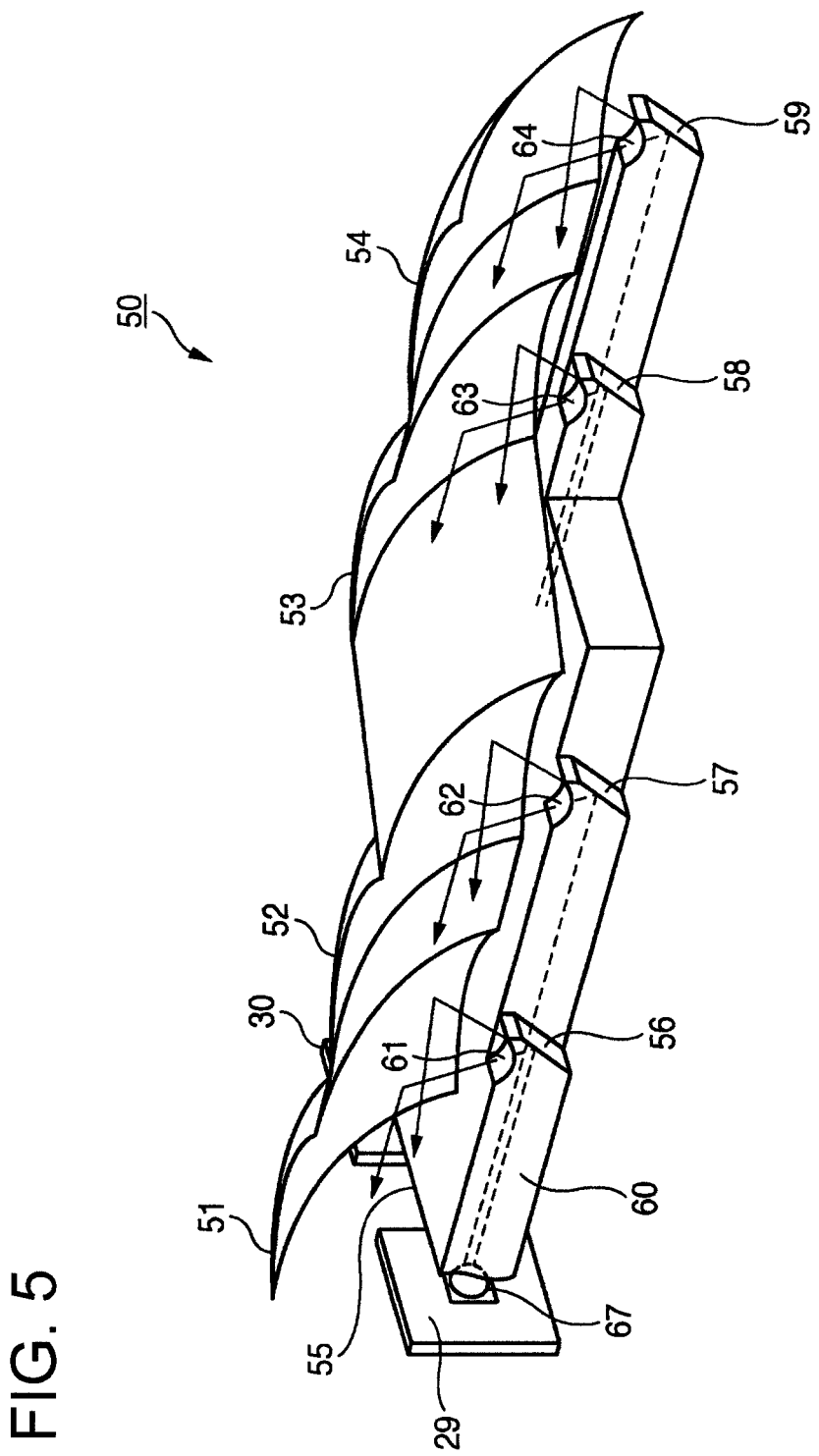
FIG. 5 is an outer perspective view of a vehicular lamp 50 according to a second embodiment of the present invention.
Figure 6:
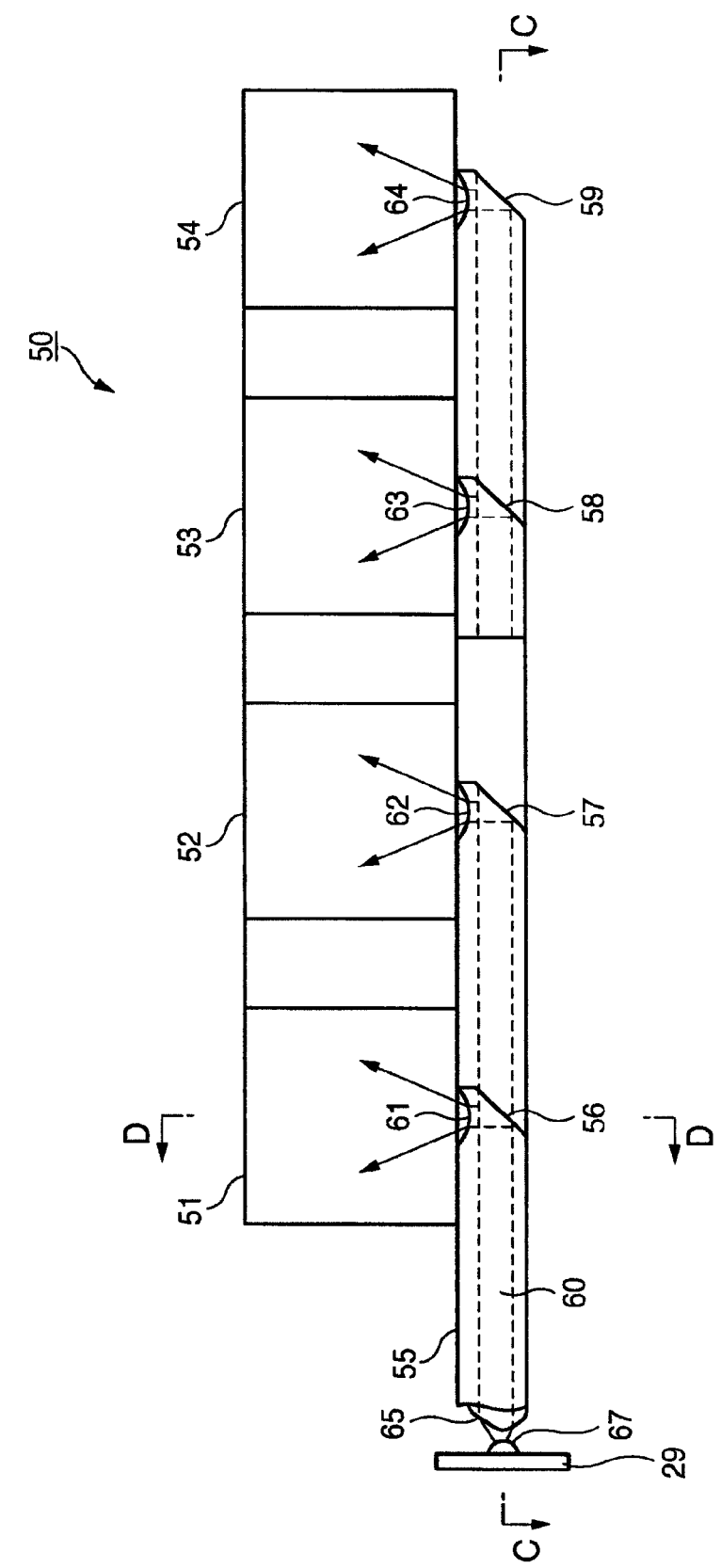
FIG. 6 is a frontal view of the vehicular lamp 50 shown in FIG. 5.

As shown in FIGS. 5 and 6, a vehicular lamp 50 according to the second embodiment of the present invention includes a first reflector 51, a second reflector 52, a third reflector 53, and a fourth reflector 54 that are integrally disposed above a light guide 55.

The light guide 55 has a plate shape, and includes a first reflection portion 56, a second reflection portion 57, a third reflection portion 58, and a fourth reflection portion 59 that internally reflect light from LEDs 67, 68 upward and are formed in a stepped configuration in the lengthwise direction of a front surface 60. In the light guide 55, a first diffusion step 61 is formed above the first reflection portion 56. Similarly, a second diffusion step 62, a third diffusion step 63, and a fourth diffusion step 64 are formed above the second reflection portion 57, the third reflection portion 58, and the fourth reflection portion 59, respectively.

Figure 7:
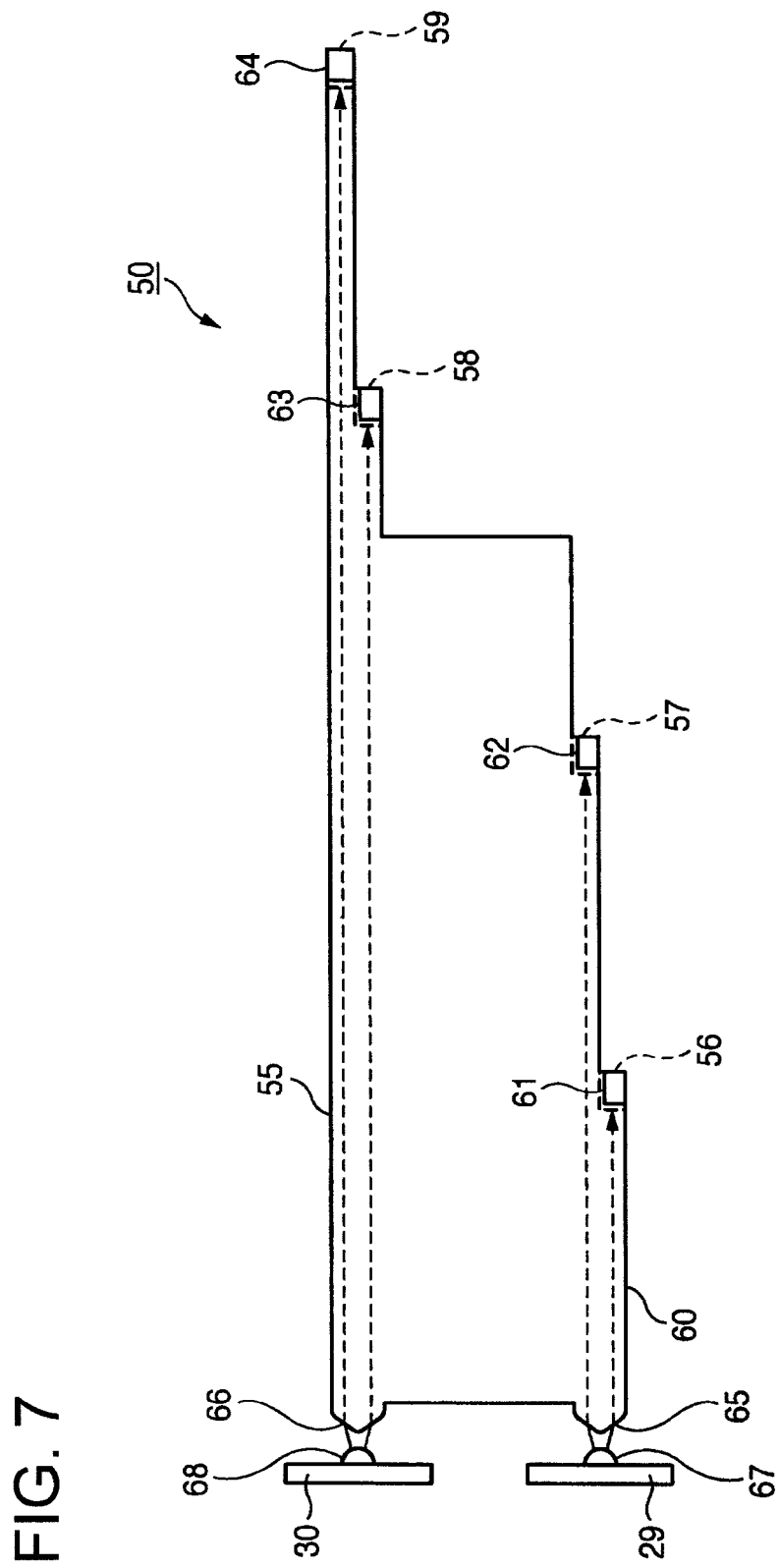
FIG. 7 is a cross-sectional view taken along a line C-C in FIG. 6.

As shown in FIG. 7, the light guide 55 includes incident portions 65, 66 disposed side by side on one end portion of the light guide 55. A first LED 67 and a second LED 68 are disposed side by side corresponding to the incident portions 65, 66.

Light from the first LED 67 enters mainly from the incident portion 65, and is guided to the first reflection portion 56 and the second reflection portion 57 and entirely reflected upward by the first reflection portion 56 and the second reflection portion 57. Then, the light is emitted in a diffused manner from the first diffusion step 61 and the second diffusion step 62 toward the first reflector 51 and the second reflector 52. Similarly, light from the second LED 68 enters mainly from the incident portion 66, and is guided to the third reflection portion 58 and the fourth reflection portion 59, and entirely reflected upward by the third reflection portion 58 and the fourth reflection portion 59. Then, the light is emitted in a diffused manner from the third diffusion step 63 and the fourth diffusion step 64 toward the third reflector 53 and the fourth reflector 54.

Figure 8:
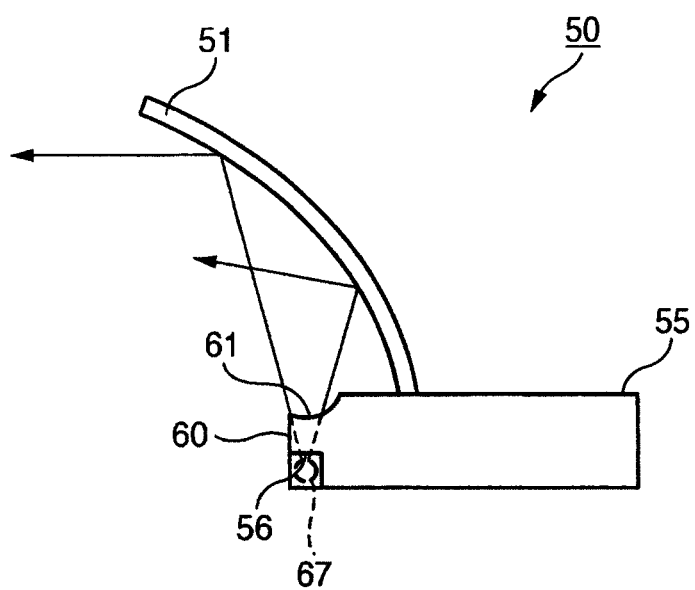
FIG. 8 is a cross-sectional view taken along a line D-D in FIG. 6.

As shown in FIG. 8, the light from the LED 67 is internally reflected by the reflection portion 56, entirely reflected toward the diffusion step 61 above the reflection portion 56, and emitted in a diffused manner from the diffusion step 61 toward the first reflector 51. Then, the light is radiated by the reflector 51 in the lamp illumination direction. At this time, the light from the LED 67 forms a pseudo light-emitting portion at the reflection portion 56 of the light guide 55. Note that the light from the LED 68 is radiated in the lamp illumination direction using a similar route, so a description thereof is omitted.

According to the vehicular lamp 50 of the second embodiment described above, the reflectors 51 to 54 are disposed above the light guide 55, and the light from the LED 67, 68 is internally reflected by the reflection portions 56 to 59 toward above the light guide 55.

Thus, the light guide 55 is not positioned in front of the reflectors 51 to 54. Therefore, the reflection direction of the reflection light from the reflectors 51 to 54 is not limited. Further, it is possible to make the lamp more compact in the depth direction.

Note that the present invention is not limited to the embodiments described above, and may be freely modified, improved, and so forth as appropriate. In addition, the structural elements used in the embodiments described above can be freely selected and are not limited in terms of material, shape, dimension, value, form, number, layout, or the like, provided that any structural elements used are capable of achieving the present invention.

While description has been made in connection with exemplary embodiments of the present invention, it will be obvious to those skilled in the art that various changes and modifications may be made therein without departing from the present invention. It is aimed, therefore, to cover in the appended claims all such changes and modifications falling within the true spirit and scope of the present invention.

DESCRIPTION OF THE REFERENCE NUMERALS

| | |
|---|---|
| 10, 50 | VEHICULAR LAMP |
| 14, 67 | FIRST LED (LIGHT SOURCE) |
| 15, 68 | SECOND LED (LIGHT SOURCE) |
| 16, 55 | LIGHT GUIDE |
| 17, 56 | FIRST REFLECTION PORTION |
| 18, 57 | SECOND REFLECTION PORTION |
| 19, 58 | THIRD REFLECTION PORTION |
| 20, 59 | FOURTH REFLECTION PORTION |
| 21 | FIFTH REFLECTION PORTION |
| 22 | SIXTH REFLECTION PORTION |
| 23, 51 | FIRST REFLECTOR |
| 24, 52 | SECOND REFLECTOR |
| 25, 53 | THIRD REFLECTOR |
| 26, 54 | FOURTH REFLECTOR |
| 27 | FIFTH REFLECTOR |
| 28 | SIXTH REFLECTOR |
| 35, 61 | FIRST DIFFUSION STEP |
| 36, 62 | SECOND DIFFUSION STEP |
| 37, 63 | THIRD DIFFUSION STEP |
| 38, 64 | FOURTH DIFFUSION STEP |
| 39 | FIFTH DIFFUSION STEP |
| 40 | SIXTH DIFFUSION STEP |

What is claimed is:

1. A vehicular lamp comprising:
a light source;
a light guide that guides light from the light source; and
a reflector,
wherein the light guide comprises:
an incident portion to which light from the light source is incident, wherein light entering from the incident portion is guided through the light guide; and
a plurality of reflection portions that internally reflect a portion of the guided light toward the reflector; and
wherein the reflector reflects, in a lamp illumination direction, reflection light that is emitted from the light guide following internal reflection by the plurality of reflection portions.

2. The vehicular lamp according to claim 1, wherein the light guide comprises:
the reflection portions arranged in a stepped configuration on one surface, and a diffusion step on another surface opposite the reflection portions.

3. The vehicular lamp according to claim 1,
wherein the reflector is disposed behind the light guide, and wherein the light from the light source is internally reflected by the reflection portions toward the back surface side of the light guide.

4. The vehicular lamp according to claim 1,
wherein the reflector is disposed above the light guide, and
wherein the light from the light source is internally reflected by the reflection portions toward above the light guide.

5. The vehicular lamp according to claim 1,
wherein the light source is an LED.

6. The vehicular lamp according to claim 1, wherein the light guide comprises:
the plurality of reflection portions arranged in a stepped configuration on one surface, and
a plurality of diffusion steps respectively arranged on another surface opposite each of the plurality of reflection portions.

7. The vehicular lamp according to claim 6 further comprising:
another light source arranged at an opposite end in lengthwise direction of the light guide from the light source; and
another reflector,
wherein the light guide comprises:
another incident portion to which light from the another light source is incident, wherein light entering from the another incident portion is guided through the light guide; and
another plurality of reflection portions that internally reflect a portion of the guided light toward the another reflector; and
wherein the another reflector reflects, in a lamp illumination direction, reflection light that is emitted from the light guide following internal reflection by the another plurality of reflection portions.

8. The vehicular lamp according to claim 7, wherein the light guide comprises:
the another plurality of reflection portions arranged in a stepped configuration on one surface, and
another diffusion step on another surface opposite the another plurality of reflection portions.

9. The vehicular lamp according to claim 8,
wherein the light guide is formed in a bar shape, and
wherein the plurality of reflection portions and another plurality of reflection portions are arranged in a stepped configuration in the lengthwise direction of a front surface of the light guide.

10. The vehicular lamp according to claim 9,
wherein the plurality of reflection portions are arranged respectively symmetrical to the another plurality of reflection portions.

11. The vehicular lamp according to claim 10,
wherein the light source and the another light source are LEDs.

12. The vehicular lamp according to claim 6 further comprising:
another light source arranged side by side with the light source; and
another reflector,
wherein the light guide comprises:
another incident portion to which light from the another light source is incident, wherein light entering from the another incident portion is guided through the light guide; and
another plurality of reflection portions that internally reflect a portion of the guided light toward the another reflector; and
wherein the another reflector reflects, in a lamp illumination direction, reflection light that is emitted from the light guide following internal reflection by the another plurality of reflection portions.

13. The vehicular lamp according to claim 12, wherein the light guide comprises:
the another plurality of reflection portions arranged in a stepped configuration on one surface, and
another diffusion step on another surface opposite the another plurality of reflection portions.

14. The vehicular lamp according to claim 13,
wherein the light guide is formed in a plate shape, and
wherein the plurality of reflection portions are arranged in a stepped configuration in the lengthwise direction of a front surface of the light guide.

15. The vehicular lamp according to claim 14,
wherein the light source and the another light source are LEDs.

* * * * *